US012736999B2

(12) United States Patent
Funfrock et al.

(10) Patent No.: US 12,736,999 B2
(45) Date of Patent: Sep. 15, 2026

(54) SYSTEMS AND TECHNIQUES FOR CLOCK DOUBLING

(71) Applicant: Micron Technology, Inc., Boise, ID (US)

(72) Inventors: Fabien Funfrock, Munich (DE); Elena Cabrera Bernal, Munich (DE); Suhas Shivapakash, Munich (DE); Jens Polney, Feldkirchen (DE)

(73) Assignee: Micron Technology, Inc., Boise, ID (US)

( * ) Notice: Subject to any disclaimer, the term of this patent is extended or adjusted under 35 U.S.C. 154(b) by 120 days.

(21) Appl. No.: 18/749,057

(22) Filed: Jun. 20, 2024

(65) Prior Publication Data

US 2025/0013258 A1 Jan. 9, 2025

Related U.S. Application Data

(60) Provisional application No. 63/525,053, filed on Jul. 5, 2023.

(51) Int. Cl.

*G11C 16/04* (2006.01)
*G06F 1/08* (2006.01)
*G06F 3/06* (2006.01)

(52) U.S. Cl.

CPC .............. *G06F 1/08* (2013.01); *G06F 3/0604* (2013.01); *G06F 3/0659* (2013.01); *G06F 3/0673* (2013.01)

(58) Field of Classification Search

CPC ........ G06F 1/08; G06F 3/0604; G06F 3/0659; G06F 3/0673

See application file for complete search history.

(56) References Cited

U.S. PATENT DOCUMENTS 7,106,654 B2 * 9/2006 Kock .................. G11C 7/1066 365/233.17
7,477,569 B2 * 1/2009 Kang ....................... G11C 8/04 365/233.5
2002/0093871 A1 * 7/2002 Kwak ................. G11C 7/1072 365/233.1

* cited by examiner

*Primary Examiner* — Pho M Luu
(74) *Attorney, Agent, or Firm* — Holland & Hart LLP

(57) ABSTRACT

Methods, systems, and devices for clock doubling are described. A clock adjustment circuit may receive as inputs two clock signals that each have the same frequency and different phases and may generate a clock signal with a higher frequency than the two clock signal inputs. A duty cycle monitor may monitor and support correction of a shift in the relative phases of the two input clocks to maintain a consistent duty cycle of the generated higher frequency clock signal. The clock adjustment circuit may reduce the length of a clock tree that is traversed by the higher frequency clock, such as to reduce bias temperature instability degradation or other types of signal degradation.

20 Claims, 7 Drawing Sheets

410
400
420
425
430
418
417
437-a
437-b
435-a
435-b
405-a
405-b
415

401
455-a
455-b
460-a
460-b
470-a
470-b
470-c
470-d
480-a
480-b
440-a
440-b
445
450

SYSTEMS AND TECHNIQUES FOR CLOCK DOUBLING

CROSS REFERENCE

The present application for patent claims priority to U.S. Patent Application No. 63/525,053 by Funfrock et al., entitled "SYSTEMS AND TECHNIQUES FOR CLOCK DOUBLING," filed Jul. 5, 2023, which is assigned to the assignee hereof, and which is expressly incorporated by reference in its entirety herein.

TECHNICAL FIELD

The following relates to one or more systems for memory, including systems and techniques for clock doubling.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

DETAILED DESCRIPTION

Figure 1:
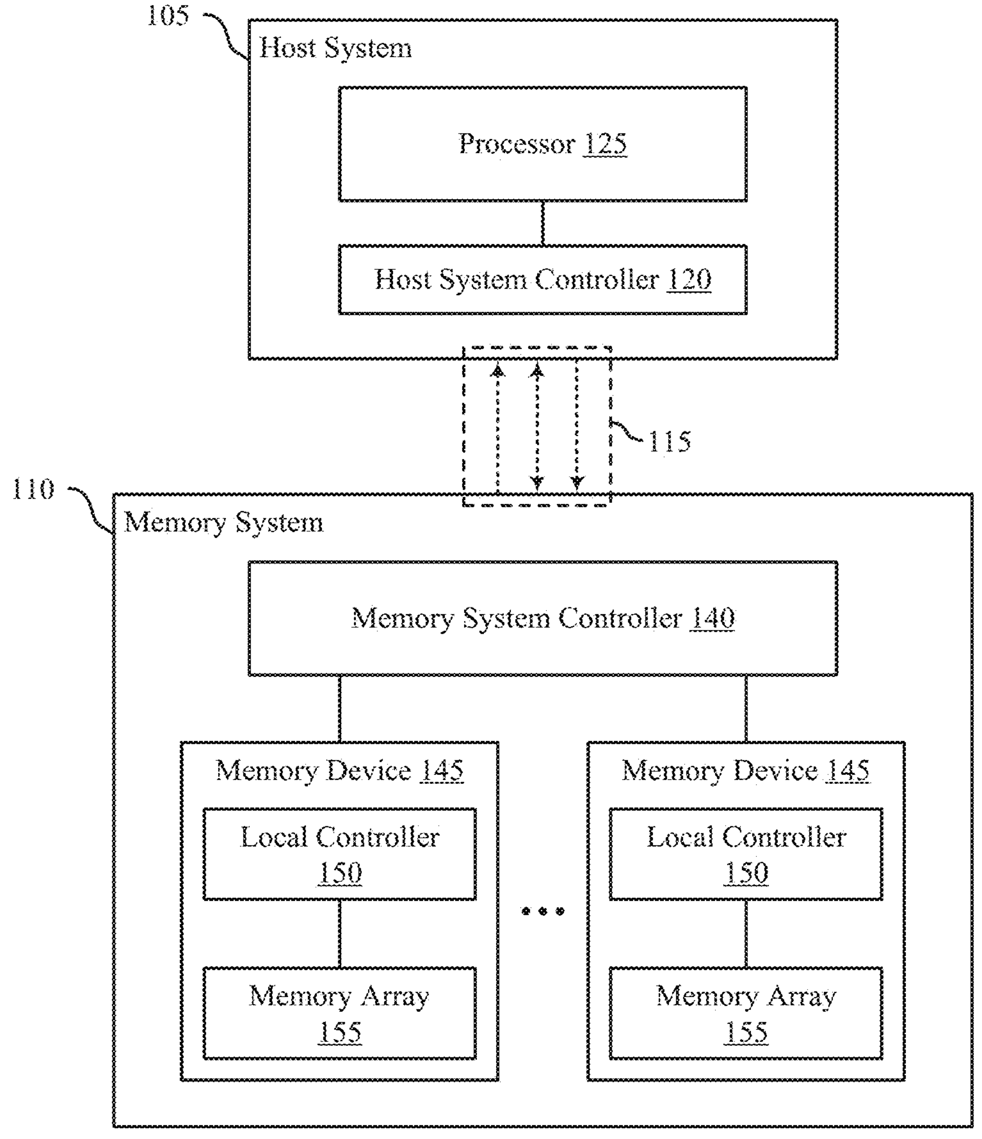
FIG. 1 shows an example of a system that supports systems and techniques for clock doubling in accordance with examples as disclosed herein.

Clock signals coordinate operations of many circuits, including operations of a memory system. A faster clock signal (e.g., a higher clock signal frequency) may support faster processing and operation of a memory system relative to a slower clock signal. However, faster clock signals are more susceptible to bias temperature instability (BTI) degradation, such as negative BTI (NBTI). Some systems (e.g., those with relatively long clock trees) may also be more susceptible to BTI degradation. For example, BTI degradation may be a function of a length of a clock signal path. That is, the longer the clock tree, the more susceptible a clock signal may be to BTI degradation, which may degrade one or more edges of the clock signal (e.g., a falling and/or rising edge of the clock). BTI degradation may cause an increase in threshold voltages, a decrease in drain current and a decrease in transconductance of the system.

Systems, techniques, and devices are described herein to generate high frequency clock signals while mitigating (e.g., reducing) BTI degradation. A circuit that doubles a clock signal (which may be referred to as a clock doubler) may provide a faster clock signal (e.g., a higher signal frequency) with improved resistance to BTI degradation compared to other high-frequency clocks and may be used in memory systems with relatively long clock trees. For example, the clock doubler circuit may receive as inputs two clock signals, having the same frequency (e.g., and opposite phases) and generate a clock signal with double the frequency of the two clock signal inputs. By implementing a clock doubler, lower frequency input clocks may traverse (e.g., be routed via) a larger portion of the clock tree. For example, the clock doubler may be located near the end of the clock tree, and the lower frequency input clocks may traverse the clock tree prior to reaching the clock doubler. As such, the clock tree traversed by the higher frequency clock may be reduced, which may reduce BTI degradation and improve a duty cycle (e.g., resolution, accuracy) of the high frequency clock. Accordingly, implementing the clock doubler may support the use of a high frequency clock having a higher quality (e.g., resolution, accuracy), which may reduce the latency of a memory system and allow the memory system to support higher bandwidths.

In some examples, the relative phases of the two input clocks may shift (e.g., due to Monte Carlo effects and/or layout asymmetries in the paths of the two input clocks) and the mismatch may result in an uneven duty cycle of the doubled clock signal (e.g., a duty cycle of greater than 50 percent). Such mismatch may be monitored and corrected using a duty cycle monitor, for example by adjusting a delay of one of the input clocks into the clock doubler circuit, among other techniques described herein. As such, the clock doubler may be implemented while compensating for defects that may otherwise reduce a quality of the doubled clock signal.

Features of the disclosure are illustrated and described in the context of systems and architectures. Features of the disclosure are further illustrated and described in the context of systems, circuits, timing diagrams, a block diagram, and a flowchart.

FIG. 1 illustrates an example of a system 100 that supports systems and techniques for clock doubling in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, a processing component) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system 110 may be implemented by a processor 125, a host system controller 120, at least one of one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include at least one of one or more components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 be dedicated to communicating one or more types of information, and channels 115 may include unidirectional channels, bidirectional channels, or both. For example, the channels 115 may include one or more command and address channels, one or more clock signal channels, one or more data channels, among other channels or combinations thereof. In some examples, a channel 115 may be configured (e.g., operable) to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

A command/address channel (e.g., a CA channel) may be operable to communicate commands between the host system 105 and the memory system 110, including control information associated with the commands (e.g., address information). Commands carried by a command/address channel may include a write command with an address for data to be written to the memory system 110 or a read command with an address of data to be read from the memory system 110.

A clock signal channel may be operable to communicate one or more clock signals between the host system 105 and the memory system 110. Clock signals may oscillate between a high state and a low state, and may support coordination (e.g., in time) between operations of the host system 105 and the memory system 110. In some examples, a clock signal may provide a timing reference for operations of the memory system 110. A clock signal may be referred to as a control clock signal, a command clock signal, or a system clock signal. A system clock signal may be generated by a system clock, which may include one or more hardware components (e.g., oscillators, crystals, logic gates, transistors).

A data channel (e.g., a DQ channel) may be operable to communicate (e.g., bidirectionally) information (e.g., data, control information) between the host system 105 and the memory system 110. For example, a data channel may communicate information from the host system 105 to be written to the memory system 110, or information read from the memory system 110 to the host system 105. In some examples, channels 115 may include one or more error detection code (EDC) channels. An EDC channel may be operable to communicate error detection signals, such as checksums or parity bits, which may accompany information conveyed over a data channel.

A clock signal with a higher frequency may result in a faster (e.g., reduced latency) system 100. However, some components (e.g., capacitors, transistors) may be associated with higher manufacturing costs in order to operate at the high frequencies of a faster clock signal. Additionally, a higher frequency clock signal may be more sensitive to BTI degradation in transistors, increasing the voltage threshold, decreasing drain current, decreasing transconductance, reducing the life of the transistors, or a combination thereof. BTI degradation may affect various transistors differently, resulting in high variability among the transistors in the system 100. BTI degradation may also occur when a clock signal is turned off, and in some cases, may be more harmful than when the clock signal is at a low frequency. To reduce the effects of BTI degradation (e.g., and manufacturing costs), while maintaining benefits of a high frequency clock, a system clock signal may be adjusted for different portions of the system 100. A subset of components of the system 100 may operate at a higher frequency to increase the speed of the system 100 as a whole (e.g., rather than each component of the system 100 operating at the higher frequency). For example, higher frequency clocks may be limited to areas of system 100 with high data traffic (e.g., channels 115 coupling the host system 105 with the memory system 110, circuitry for accessing memory cells in memory arrays 155), while other areas of the system 100 may be operated at lower frequency clocks.

The memory system 110 may include one or more circuits, such as a clock doubler, to adjust the frequency, phase, or other aspects of a clock signal (e.g., branches of a system clock signal). Accordingly, different portions of the memory system 110 may be operated at clock signals of different frequencies, phases, or both. A clock adjustment circuit, such as a clock doubler circuit (e.g., a circuit that outputs a clock signal with a higher signal frequency from two or more input clock signals with lower signal frequencies) may improve resistance to BTI degradation compared to other implementations of high-frequency clocks. For example, a clock doubler circuit of the memory system 110 may receive two (e.g., or more) clock signals as inputs, having the same frequency (e.g., and opposite phases) and generate an output clock signal with a higher frequency (e.g., double the frequency) of the two input clock signals. In some examples, the input clock signals may be generated by the memory system 110, such as based on (e.g., in response to) an access command from the host system 105, and the input clock signals may traverse (e.g., be routed via) a portion of a clock tree of the memory system 110 before arriving at the clock doubler circuit.

In some examples, the relative phases of the two input clocks may shift (e.g., due to Monte Carlo effects and/or layout asymmetries in the paths of the two input clocks), and the mismatch may result in an uneven spacing between subsequent pulses of the output clock signal (e.g., which may result in the duty cycle of the output clock signal being greater than or less than 50 percent). Such mismatch may be monitored and corrected, for example, by adjusting a delay of one of the input clocks into the clock doubler circuit.

In some cases, the clock doubler circuit may be bypassed, for example when the memory system 110, or a portion of the memory system 110, is in an idle mode. In these cases, a portion of the memory system 110 that receives the doubled clock signal when the memory system is not in an idle mode may instead receive one of the input clock signals (e.g., with a frequency lower than the frequency of the clock doubler output clock signal). Such bypassing while in the idle mode, by operating the portion of the memory system 110 at the lower frequency input clock signal, may support a reduced power consumption of the memory system 110 expected in idle mode and may also avoid BTI degradation associated with a lack of a clock signal in circuits located after the clock doubler.

The clock doubler circuit allows a larger portion of a clock tree of a memory system 110 to be traversed with lower frequency clocks. The portion of the clock tree traversed by the higher frequency clock may be reduced, which may reduce BTI degradation and improve a duty cycle (e.g., resolution, accuracy) of the high frequency clock. Accordingly, incorporating the clock doubler reduces the latency of the memory system 110, allows the memory system 110 to support higher bandwidths, increases the drain current, transconductance, lifespan, and stability of the threshold voltage of transistors in the memory system 110. In some examples, other systems, such as a host system 105 may implement a clock doubler circuit to mitigate against BTI degradation while supporting operation at a higher frequency clock signal.

In addition to applicability in systems as described herein, systems and techniques for clock doubling while protecting against BTI using divided clocks may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by supporting higher clock signal frequencies to increase processing speed and bandwidth and decrease latency and response times, such as to improve user experience, while protecting against (e.g., reducing, mitigating) BTI degradation, among other benefits.

Figures 2A, 2B:
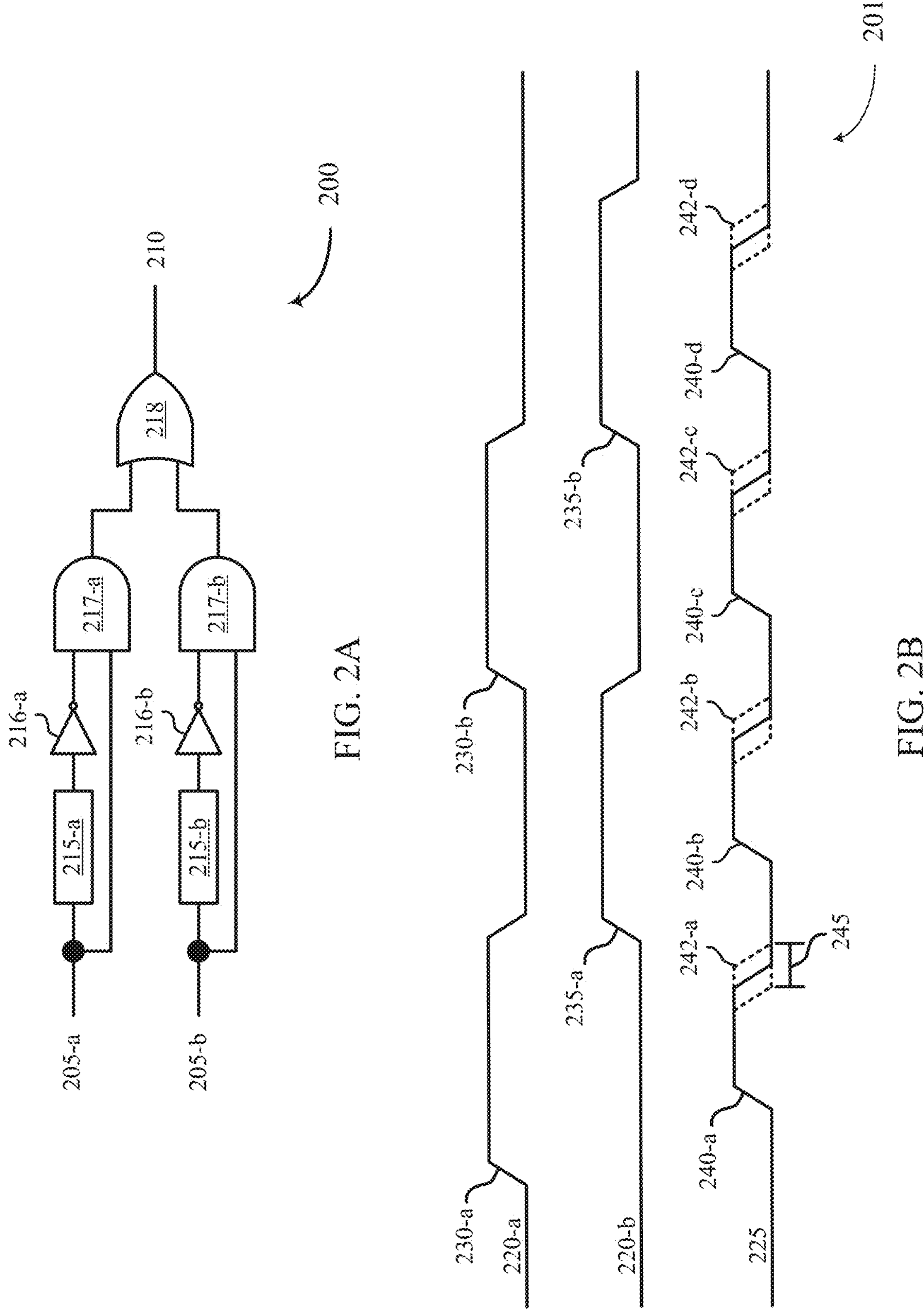
FIGS. 2A and 2B show examples of a circuit and a timing diagram that support systems and techniques for clock doubling in accordance with examples as disclosed herein.

FIGS. 2A and 2B illustrate an example of a circuit 200 (e.g., a clock doubler) and an example of a timing diagram 201, respectively, that support systems and techniques for clock doubling in accordance with examples as disclosed herein. Circuit 200 may be incorporated into a system 100 (e.g., as part of a memory system 110) and includes inputs 205-*a* and 205-*b*, output 210, delay components 215-*a* and 215-*b* and various logic gates, such as inverters 216-*a* and 216-*b*, AND gates 217-*a* and 217-*b*, and an OR gate 218. The input 205-*a* may correspond to clock signal 220-*a* with rising edges 230 (e.g., rising edges 230-*a* and 230-*b*). The input 205-*b* may correspond to clock signal 220-*b* with rising edges 235 (e.g., rising edges 235-*a* and 235-*b*). The clock signal 220-*a* and clock signal 220-*b* may have the same frequency and the phases may be shifted relative to each other. The output 210 may correspond to clock signal 225 with rising edges 240 (e.g., rising edges 240-*a* through 240-*d*) and falling edges 242 (e.g., falling edges 242-*a* through 242-*d*). Clock signal 225 may have a variable pulse width that is individually trimmed with pulse width variability 245. Circuit 200 may be coupled with a controller (e.g., a memory system controller 140, a local controller 150) configured to access a memory array 155, for example, using (e.g., in accordance with) the clock signal 225 output by the circuit 200. Clock signals 220 and 225 may be generated internally in a memory system 110 that implements the circuit 200 and propagated to various components (e.g., of the memory system 110, a memory device 145) along a clock tree of the memory system 110. In some examples, clock signals 220 and 225 may be generated in response to a command (e.g., a read command, a command to access memory cells). In some examples, clock signals 220 may be always-on.

Clock signals may suffer BTI degradation due to high frequency clocking and long clock tree paths. To reduce BTI degradation, a system may include low frequency clock signals. However, low frequency clock signals may result in slower operations, lower bandwidth, lower data rates, and other adverse effects. The circuit 200 may allow the system 100 to support using lower frequency clock signals 220 along a portion of the clock tree (e.g., portions upstream of the circuit 200, such as closer to a channel 115) and using a higher frequency clock signal 225 (e.g., a clock with a frequency twice that of the lower frequency clock signals 220) along another portion of the clock tree (e.g., the end of the clock tree, a portion downstream the circuit 200, such as closer to a memory array 155). The higher frequency clock signal 225 may be generated based on an external command (e.g., a read command, a command to access memory cells). Clock signal 225 may be used to perform the command (e.g., access the memory cells). For example, access circuitry included in a memory system 110 and used to access a memory array 155 (e.g., one or more decoders, one or more sense components, one or more controllers, one or more input/output (I/O) components) may operate in accordance with the clock signal 225.

The input 205-*a* (e.g., clock signal 220-*a*) and input 205-*b* (e.g., clock signal 220-*b*) of circuit 200 may be combined to generate the output 210 (e.g., clock signal 225). The clock signals 220 may be generated internally (e.g., on a DRAM chip). The clock signal 220-*a* (e.g., input 205-*a*) and clock signal 220-*b* (e.g., input 205-*b*) may have the same frequency. In some examples, clock signal 220-*a* and clock signal 220-*b* may both start in the same low mode (e.g., both clock signals 220 are low before the rising edge 230-*a* of clock signal 220-*a*). The rising edges 235 of clock signal 220-*b* may be delayed (e.g., shifted) relative to the rising edges 230 of clock signal 220-*a*. For example, clock signal 220-*b* may be delayed by a phase shift of 180 degrees relative to clock signal 220-*a* such that the rising edges 235 of clock signal 220-*b* correspond with (e.g., are aligned with, are simultaneous or near-simultaneous with) the falling edges of clock signal 220-*a*. In some cases, the phases of clock signals 220 may shift such that they are not 180 degrees relative to each other, which may be referred to as a phase-to-phase mismatch of the clock signals 220. In some examples, a duty cycle monitor circuit may support adjusting the phases to maintain the 180 degree relationship, as described herein, including with reference to FIGS. 3A-3C.

The inputs 205 (e.g., clock signals 220) of circuit 200 may be used to generate output 210 (e.g., clock signal 225). The input 205-*a* may be routed through delay component 215-*a* and inverter 216-*a* before being input into AND gate 217-*a*. The other input of the AND gate 217-*a* may be the unmodified input 205-*a* (e.g., not delayed and not inverted). The input 205-*b* of circuit 200 may enter delay component 215-*b* and an inverter before being input into an AND gate 217-*b*. The other input of the AND gate 217-*b* may be the unmodified input 205-*b* (e.g., not delayed and not inverted). The delay components 215 may be adjusted to modify the delays of corresponding inputs 205 into corresponding AND gates 217. The output of AND gate 217-*a* and the output of AND gate 217-*b* may be inputs of OR gate 218. The output of the OR gate 218 may be the output 210 and correspond to the clock signal 225.

Clock signal 225 may have properties different than clock signals 220. Clock signal 225 may have twice the frequency of the input clock signals 220 (clock signals 220-*a* and 220-*b* having the same frequency). Clock signal 225 may have a smaller pulse width than (e.g., half the pulse width of) the input clock signals 220 (clock signals 220-*a* and 220-*b* having the same pulse width). The pulse width of the clock signal 225 may be based on the delay component 215-*a* and the delay component 215-*b*. For example, the clock signal 225 (e.g., rising edges 240 and falling edges 242) may be generated based on the rising edges 230 and 235 of the clock signals 220-*a* and 220-*b*, respectively, and the delay of the clocks signals 220 imposed by the delay components 215. For instance, the output of an AND gate 217 may be high if the unmodified input 205 is high and the modified input 205 (e.g., the input 205 routed through a delay component 215 and an inverter 216) is low, for example, due to the inverter 216 inverting the modified input 205. Accordingly, the output of an AND gate 217, and thus the clock signal 225, may be high (e.g., on, asserted) for a duration of time that a modified input 205 is delayed by a delay component 215 while the unmodified input 205 is high. As such, a rising edge of the unmodified input 205 may correspond to a rising edge 240 of a pulse of the clock signal 225, and a rising edge of the modified input 205 may correspond to a falling edge 242 of the pulse of the clock signal 225.

The duty cycle of the clock signal 225 (e.g., a percentage or ratio of time that the clock signal 225 is high) may be adjusted by modifying (e.g., adding, fusing) the delay components 215 to modify a delay imposed on the inputs 205 by the delay components 215. For example, adjusting the delay imposed by the delay components 215 may adjust a duration between the rising edge of the unmodified input 205 and the rising edge of the modified input 205, where the duration between the rising edges corresponds to the pulse width of the clock signal 225. As such, the pulse width of the clock signal 225 may be individually trimmed using the delay components 215. The delay components 215 can be controlled (e.g., adjusted by a test mode) such that the delay components 215 adjust the pulse width of clock signal 225 according to the pulse width variability 245. For example, after initial generation of the clock signal 225, the pulse width of the clock signal 225 may be adjusted by adjusting the delay imposed by the delay components 215. Adjustment of the clock signal 225 (e.g., as part of the test mode) may compensate for Monte Carlo effects or process variations of the clock signal 225 duty cycle. In some examples, the pulse width of the clock signal 225 may be half the pulse width of clock signal 220-*a*. In other examples, the pulse width of clock signal 225 may be less than half the pulse width of clock signal 220-*a*. In other examples, the pulse width of clock signal 225 may be more than half the pulse width of clock signal 220-*a*.

The phase of the clock signal 225 may be different than the phase of the clock signal 220-*a* and the clock signal 220-*b*. For example, the phase of the clock signal 225 may be shifted (e.g., delayed) relative to the clock signals 220, such as due to propagation of the clock signals 220 through the circuit 200.

A controller coupled with the circuit 200 may use clock signal 225 to perform a command (e.g., access a memory array). For example, the controller may use the clock signal 225 to access one or more memory cells of a memory array in accordance with the command. The clock signal 225 may be less sensitive to BTI degradation than other clock signals of similar frequencies, such as due to propagating along a smaller (e.g., shorter) portion of a clock tree. Accordingly, clock signal 225 may be implemented in systems with longer clock paths with improved BTI resistance and robustness.

Figure 3A:
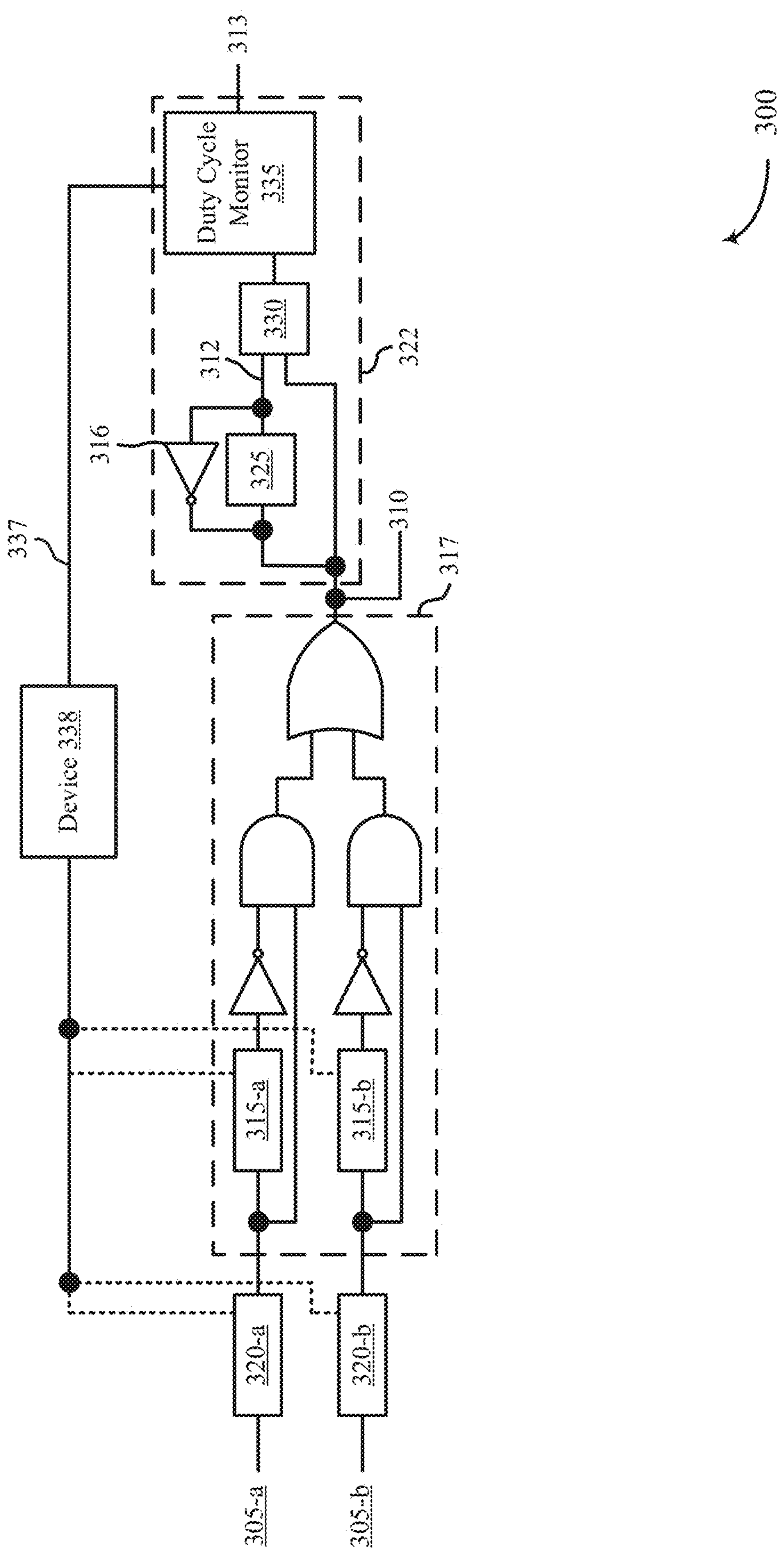
FIGS. 3A, 3B, and 3C show examples of a circuit and timing diagrams that support systems and techniques for clock doubling in accordance with examples as disclosed herein.
Figures 3B, 3C:
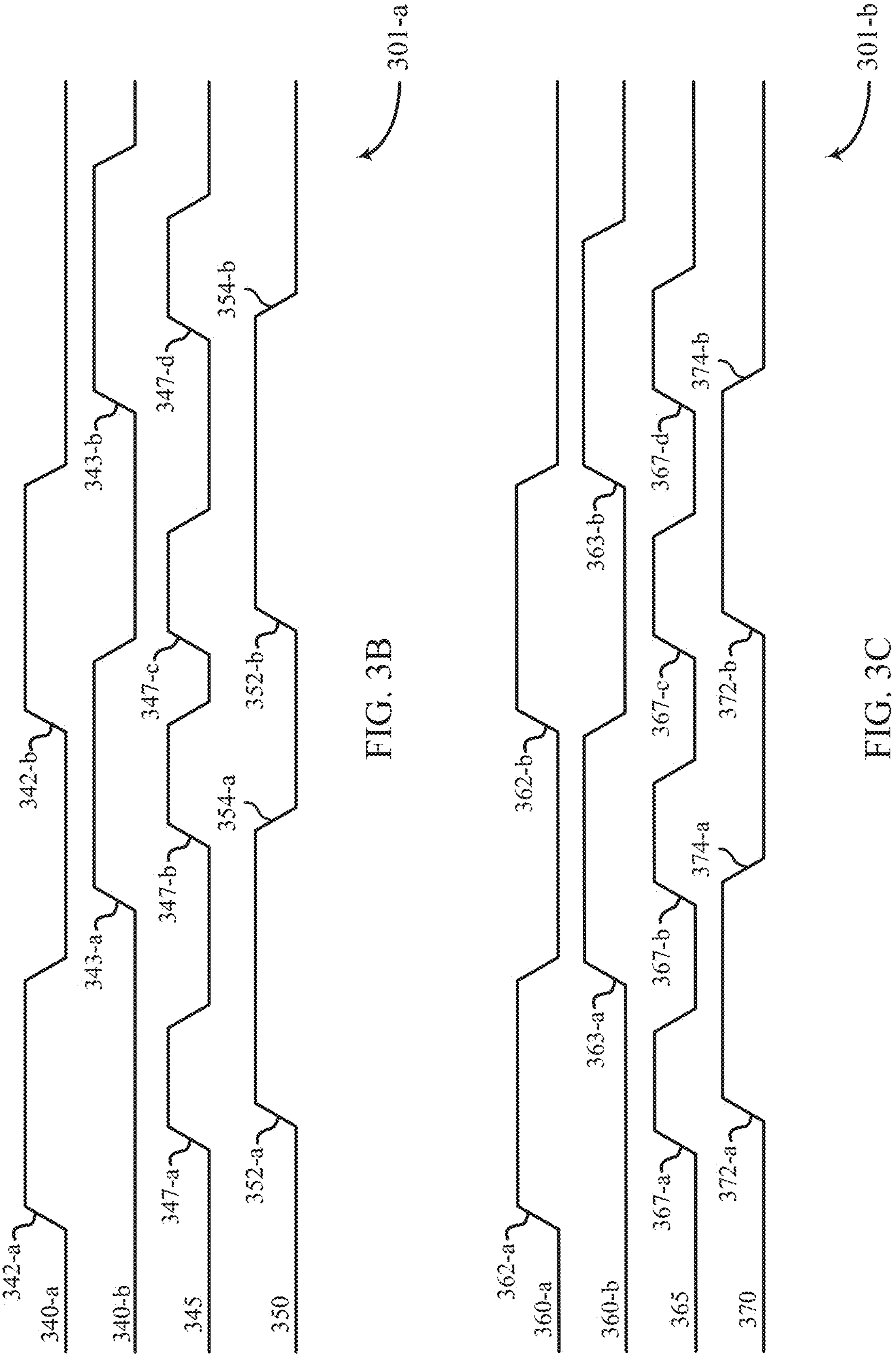

FIGS. 3A, 3B, and 3C show an example of a circuit 300 and examples of timing diagrams 301-*a* and 301-*b*, respectively, that support systems and techniques for clock doubling in accordance with examples as disclosed herein. Circuit 300 may be incorporated into a system 100 (e.g., as part of a memory system 110) and a doubling circuit 317 may be an example of a circuit 200 (e.g., a circuit that supports outputting a higher frequency clock signal using two lower frequency clock signals as inputs). The circuit 300 may include inputs 305-*a* and 305-*b*, an output 310, a monitoring output 313, the doubling circuit 317, delay components 320 (e.g., delay components 320-*a* and 320-*b*), a monitoring circuit 322, or a combination thereof. The doubling circuit 317 may correspond to the circuit 200 and include delay components 315 (e.g., delay components 315-*a* and 315-*b*, delay components 215), inverters, AND gates, and an OR gate. The monitoring circuit 322 may include a clock component 325, a multiplexer 330, a duty cycle monitor 335, and an inverter 316.

The doubling circuit 317 may be coupled with the monitoring circuit 322 such that an output of the doubling circuit 317 is input to the monitoring circuit 322. Clock signals 340, 345, and 350 may be generated internally in a memory system 110 that implements the circuit 300 and propagated to various components (e.g., of the memory system 110, a memory device 145) along a clock tree of the memory system 110. In some examples, the monitoring output 313 may relay a clock signal or an indication of whether a duty cycle of the output of the doubling circuit 317 satisfies a threshold to a pin (e.g., of the memory system 110, such as to support adjustment during testing).

Timing diagrams 301-*a* and 301-*b* show examples of clock signals generated by the circuit 300. In the example of the timing diagram 301-*a*, the input 305-*a* may correspond to clock signal 340-*a* with rising edges 342 (e.g., rising edges 342-*a* and 342-*b*), the input 305-*b* may correspond to clock signal 340-*b* with rising edges 343 (e.g., rising edges 343-*a* and 343-*b*), the output 310 may correspond to clock signal 345 with rising edges 347 (e.g., rising edges 347-*a* through 347-*d*). Additionally, a signal 312 generated by the monitoring circuit 322 (e.g., output by clock component 325) may correspond to the clock signal 350 with rising edges 352 (e.g., rising edges 352-*a* and 352-*b*) and falling edges 354 (e.g., falling edges 354-*a* and 354-*b*). In the example of the timing diagram 301-*b*, the input 305-*a* may correspond to clock signal 360-*a* with rising edges 362 (e.g., rising edges 362-*a* and 362-*b*), the input 305-*b* may correspond to clock signal 360-*b* with rising edges 363 (e.g., rising edges 363-*a* and 363-*b*), the output 310 may correspond to clock signal 365 with rising edges 367 (e.g., rising edges 367-*a* through 367-*d*), and the signal 312 may correspond to the clock signal 370 with rising edges 372 (e.g., rising edges 372-*a* and 372-*b*) and falling edges 374 (e.g., falling edges 374-*a* and 374-*b*). Clock signals 340-*a*, 340-*b*, 350, 360-*a*, 360-*b*, and 370 may each have the same frequency. Clock signals 345 and 365 may have the same frequency, the frequency being higher (e.g., twice) the frequency of a clock signal 340 (e.g., a clock signal 360).

The doubling circuit 317 may use the clock signals 340 to generate the clock signal 345 as described with reference to FIGS. 2A and 2B. The clock signal 340-*a* and clock signal 340-*b* may have the same frequency but the phases may be shifted relative to each other. In some examples, a 180 degree relative phase shift may distribute pulses of clock signal 345 more evenly than other relative phase shifts. In some cases, however, the relative phase shift of the clock signals 340 may be different than 180 degrees, for example due to Monte Carlo effects and layout asymmetries in the clock paths of clock signals 340-*a* and 340-*b*. In the example of the timing diagram 301-*a*, clock signal 340-*b* has a phase shift of more than 180 degrees relative to clock signal 340-*a* such that the rising edges 363 occur after the falling edges of the clock signal 340-*a*, and such non-180 degree relative phase shifting may be referred to as phase-to-phase mismatch. This mismatch may result in unevenly spaced pulses of clock signal 345 (e.g., a rising edge 347-*b* may be closer to a rising edge 347-*c* than a rising edge 347-*a*).

The monitoring circuit 322 may identify and support correcting the mismatch in the phases of the clock signal 340-*a* and the clock signal 340-*b*. The monitoring circuit 322 may receive the clock signal 345 as an input and output one or more of a feedback signal 337 and a monitoring output 313. To support outputting the feedback signal 337 and the monitoring output 313, the clock signal 345 may be input into the clock component 325. The clock component 325 may adjust the clock signal 345 to be the signal 312 (corresponding to clock signal 350) that has a lower frequency than (e.g., half the frequency of) the clock signal 345. For example, the clock component 325 and the inverter 316 that feeds back the output of the clock component 325 to the input of the clock component 325 may operate as a clock divider to generate the clock signal 350 from the clock signal 345. Clock signal 350 may be generated based on the rising edges 347 of the clock signal 345. For example, two consecutive rising edges 347 may generate a rising edge 352 and a falling edge 354 of the clock signal 350 (e.g., the rising edge 347-*a* may correspond to the rising edge 352-*a*, the rising edge 347-*b* may correspond to the falling edge 354-*a*, and so on). Clock signal 350 (e.g., signal 312) may be input into a multiplexer 330. Clock signal 345 (e.g., output 310) may also be input directly into the multiplexer 330.

The monitoring circuit 322 may identify and support correcting phase-to-phase mismatch according to various techniques, such as based on whether the multiplexer 330 outputs the clock signal 350 or the clock signal 345. In some examples, the multiplexer 330 outputs the clock signal 350 (e.g., based on a selection signal input into the multiplexer 330) to the duty cycle monitor 335. The duty cycle monitor 335 may monitor the duty cycle of the clock signal 350. A mismatch (e.g., a relative phase shift that is not 180 degrees, a misalignment between the rising edges 342 of clock signal 340-*a* and the falling edges of clock signal 340-*b*) may result in clock signal 345 being non-periodic (e.g., having unevenly spaced pulses). If there is a mismatch between clock signal 340-*a* and 340-*b*, the duty cycle monitor 335 may measure a duty cycle of clock signal 350 to be higher or lower than 50%. For example, if clock signal 340-*b* is delayed more than 180 degrees relative to clock signal 340-*a* (as depicted), then the duty cycle monitor 335 may determine that the duty cycle of clock signal 350 is more than 50%. (e.g., and vice versa if the clock signal 340-*b* is delayed less than 180 degrees relative to the clock signal 340-*a*). In other words, if the duty cycle of the clock signal 350 is not 50%, then the duty cycle monitor 335 may determine that there is a mismatch between the phase of the clock signal 340-*a* and the phase of the clock signal 340-*b*.

In some examples, the multiplexer outputs the clock signal 345 (e.g., based on the selection signal input into the multiplexer 330) to the duty cycle monitor 335. The duty cycle monitor 335 may monitor the duty cycle of the clock signal 345 and receive an indication of the frequency of the clock signals 340, such as provided by a tester. Using the frequency of the clock signals 340 and the duty cycle of the clock signal 345, the duty cycle monitor 335 may determine (e.g., compute) a pulse width (e.g., an absolute pulse width, such as the high time in picoseconds) of the clock signal 345. If the duty cycle monitor 335 determines that the pulse width of clock signal 345 fails to satisfy a threshold pulse width (e.g., that the pulse width is not equal to the threshold pulse width, that the pulse width is not within a range of pulse widths) the duty cycle monitor 335 may determine that there is a mismatch between the phase of the clock signal 340-*a* and the phase of the clock signal 340-*b*.

If the duty cycle monitor 335 determines that there is a mismatch between the phase of the clock signal 340-*a* and the phase of the clock signal 340-*b*, then the duty cycle monitor 335 may attempt to correct it. For example, the duty cycle monitor 335 may transmit a feedback signal 337 (e.g., directly) to one or more of the delay components 315, one or more of the delay components 320, or both, to adjust the corresponding delay(s) of the component(s). For example, the feedback signal 337 may indicate a respective adjustment to a respective delay of a respective delay component. Additionally, or alternatively, the duty cycle monitor 335 may transmit the feedback signal 337 to a device 338 (e.g., a device that implements a safe adjustment mode or a training algorithm, a state machine, a logic block) to adjust the delays of the delay components 320. For example, the feedback signal 337 may indicate whether there is a phase-to-phase mismatch, such as whether the duty cycle of the clock signal satisfies a threshold (e.g., is not 50%) or whether the pulse width of the clock signal 345 fails to satisfy the threshold pulse width. Based on the feedback signal 337 indicating a phase-to-phase mismatch, the device 338 may determine and perform one or more adjustments to the delay components. Additionally, or alternatively, the duty cycle monitor 335 may output the monitoring output 313, such as to a tester, that indicates whether the there is a phase-to-phase mismatch, which may be used to determine and perform one or more adjustments to the delay components.

The clock signal 345, and thus the clock signal 350, may be adjusted based on adjusting one or more of the delays of the delay components. For example, adjusting a respective delay of one or more of the delay components 320 may adjust a phase of the clock signal 340-*a* relative to the clock signal 340-*b*. Adjusting a respective delay of one or more of the delay components 315 may adjust a pulse width of the clock signal 345. The duty cycle monitor 335 may determine whether the adjusted clock signals 340 are mismatched if the relative phase shift satisfies a threshold (e.g., the phase shift is less than 179 degrees or more than 181 degrees, if the duty cycle of the adjusted clock signal 350 is greater than or less than 50%) or, for example, if the pulse width still fails to satisfy the threshold pulse width. In some examples, adjusting the pulse width of the clock signal 345 may not adjust a relative phase of the clock signals 340, but may adjust the clock signal 345 such that the clock signal 345 satisfies one or more operating constraints for the clock signal 345. If the adjusted clock signals are still mismatched after the adjustment, the duty cycle monitor 335 may support additional adjustments to one or more delays of the delay components. The duty cycle monitor 335 may repeat this process (e.g., using a guess-and-check method of adjusting the delays) until the phase-to-phase mismatch is corrected, such as until phase shift between the two inputs 305-*a* and 305-*b* no longer satisfies the threshold (e.g., the phase shift is 180 degrees, the phase shift generates a duty cycle of clock signal 370 that is 49-51%), or for example, until the pulse width satisfies the threshold pulse width.

Timing diagram 301-*b* shows an example of a corrected timing diagram (e.g., timing diagram 301-*b* after the phase-to-phase mismatch is corrected). In the example of timing diagram 301-*b*, clock signal 360-*a* may correspond to clock signal 340-*a*, and clock signal 360-*b* may correspond to clock signal 340-*b* after an adjustment to delay component 320-*b* was made, such as to reduce a delay of the clock signal 340-*b*. Clock signal 365 may correspond to an adjusted clock signal 345 and may have a more ideal (e.g., even, uniform) spacing of pulses (e.g., absolute pulse width) than that of clock signal 345. Clock signal 370 may correspond to clock signal 350 and may have a duty cycle closer to (e.g., equal to) 50% than that of clock signal 350.

The clock signal 370 may be less sensitive to BTI degradation than other clock signals of similar frequencies while maintaining an 50% duty cycle and evenly spaced pulses. Accordingly, clock signal 370 may be implemented in systems with longer clock paths with improved BTI resistance and robustness.

Figures 4A, 4B:
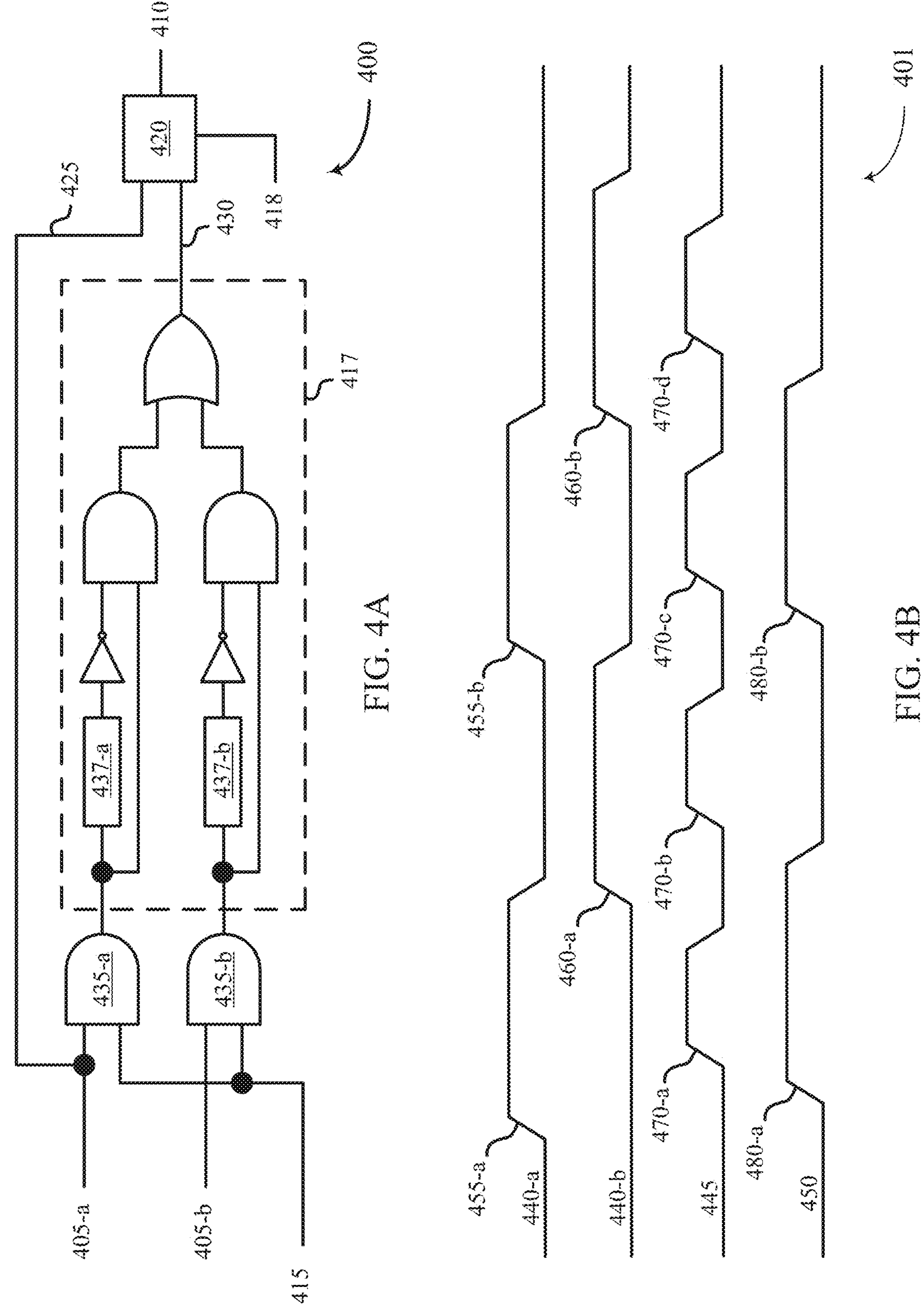
FIGS. 4A and 4B show examples of a circuit and a timing diagram that support systems and techniques for clock doubling in accordance with examples as disclosed herein.

FIGS. 4A and 4B show an example of a circuit 400 and an example of a timing diagram 401 that support systems and techniques for clock doubling in accordance with examples as disclosed herein. Circuit 400 may include inputs 405, an output 410, a bypass signal 415, a bypass selection signal 418, a multiplexer 420, a signal 425, an output 430, AND gates 435 (e.g., AND gates 435-*a* and

435-*b*), delay components 437 (e.g., delay components 437-*a* and 437-*b*), and a doubling circuit 417, which may be an example of a circuit 200 or a doubling circuit 317. The input 405-*a* may correspond to clock signal 440-*a* with rising edges 455 (e.g., rising edges 455-*a* and 455-*b*), input 405-*b* may correspond to clock signal 440-*b* with rising edges 460 (e.g., rising edges 460-*a* and 460-*b*), output 430 may correspond to clock signal 445 with rising edges 470 (e.g., rising edges 470-*a* through 470-*d*), and signal 425 may correspond to clock signal 450 with rising edges 480 (e.g., rising edges 480-*a* and 480-*b*).

Circuit 400 may implement aspects of circuit 200 or circuit 300. For example, the doubling circuit 417 may use inputs 405-*a* and 405-*b* (clock signals 440-*a* and 440-*b* each having an identical frequency and a relative 180 degree phase shift, which may be corrected to 180 degrees, such as by using a monitoring circuit 322) to generate output 430 (clock signal 445 having a frequency higher than (e.g., twice) the frequency of the clock signals 440). In some examples, the multiplexer 420 may select output 430 such that output 410 corresponds to clock signal 445. In other examples, the multiplexer 420 may select signal 425 such that output 410 corresponds to clock signal 450. The multiplexer 420 may select the output 430 or the signal 425 based on the bypass selection signal 418.

In some cases, BTI degradation in a circuit may increase if no clock signal is present. High frequency clock signals may be more sensitive to BTI degradation because of operating at a lower pulse width, which may result in having a tighter timing budget. Because BTI degradation may be the relatively more harmful when there are no clock signals compared to when a clock signal is present, it may be beneficial to implement relatively low frequency clock signals into circuits to mitigate the degradation effect. Lower frequency clocks may be used, for example, when a circuit is in a low power or idle mode, as lower frequency clocks may be associated with lower power consumption than higher frequency clocks.

In some examples, circuit 400 (e.g., a memory system that implements that circuit 400) may enter an idle mode (e.g., due to a command, a lack of or reduction in performing access commands). In response to entering the idle mode, the circuit 400 may switch the output of the multiplexer 420 from outputting the clock signal 445 (e.g., selecting the output 430) to outputting the clock signal 450 (e.g., selecting the signal 425). The signal 425 may be a forwarded input 405-*a* to the multiplexer 420. As such, the signal 425 may correspond to the clock signal 440-*a* with a relatively small phase shift relative to the clock signal 440-*a*, such as due to a propagation of the clock signal 440-*a* to the multiplexer 420. The memory system that implements the circuit 400 (e.g., a controller of the memory system) may drive the bypass selection signal 418 such that the multiplexer 420 may select the signal 425 such that output 410 corresponds to clock signal 450. If the memory system exits the idle mode, the memory system may drive the bypass selection signal 418 such that the multiplexer selects the output 430 such that the output 410 corresponds to the clock signal 445. Accordingly, the clock signal 445 (e.g., a high frequency clock) may be used while the memory system is not in an idle mode, and the clock signal 450 (e.g., a low frequency clock) may be used while the memory system is in an idle mode. In some examples, input 405-*b* may be forwarded instead of input 405-*a* such that output 410 corresponds to a delayed clock signal 440-*b*. The use of a lower frequency clock (opposed to a high frequency clock or no clock at all) may mitigate the effects of BTI degradation while maintaining a reduced power consumption, as expected in idle mode.

Maintaining a high or a low state of the doubling circuit 417 may cause degradation of the clock signals 440. If the doubling circuit 417 is kept in a high state (e.g., while the circuit 400 is in the idle mode), then the rising edges 455 and 460 of the clock signals 440 may be degraded as they are routed via the doubling circuit 417 again (e.g., after exiting the idle mode). If the doubling circuit 417 is kept in a low state, then the falling edges of the clock signals 440 may be degraded (e.g., and the rising edges 455 and 460 may be maintained) as they are routed via the doubling circuit 417 again. Because the clock signal 445 is generated based on the rising edges 455 and 460 of the clock signals 440, maintaining (e.g., reducing degradation of) the rising edges 455 and 460 may be more beneficial than maintaining the falling edges. To prevent (e.g., reduce, mitigate) rising edge degradation and pulse width degradation while the output of the doubling circuit 417 is bypassed (e.g., while the multiplexer 420 selects the signal 425), the circuit 400 may maintain the doubling circuit 417 in a low state using AND gates 435 and bypass signal 415. For example, based on entering the idle mode, the memory system may switch the bypass signal 415 to a low state. The AND gates 435 may receive the bypass signal 415 and their respective inputs 405 as inputs. Based on the bypass signal 415 being in a low state, the AND gates 435 may output a low signal to maintain the doubling circuit 417 in a low state while circuit 400 is in the idle mode. If the memory system is not in an idle mode, the bypass signal 415 may be switched to a high state, and the AND gates 435 may output their respective inputs 405 (e.g., respective clock signals 440).

In response to exiting the idle mode (e.g., entering a non-idle state due to a command, due to a determination), the circuit 400 may switch the output 410 of the multiplexer from outputting the clock signal 450 to outputting the clock signal 445, such as based on switching a state of the bypass selection signal 418. By using clock signal 450 during idle mode operation, a lower frequency clock, (rather than a higher frequency clock signal 445 or no clock at all), BTI degradation and power consumption associated with idle mode operation are reduced.

Figure 5:
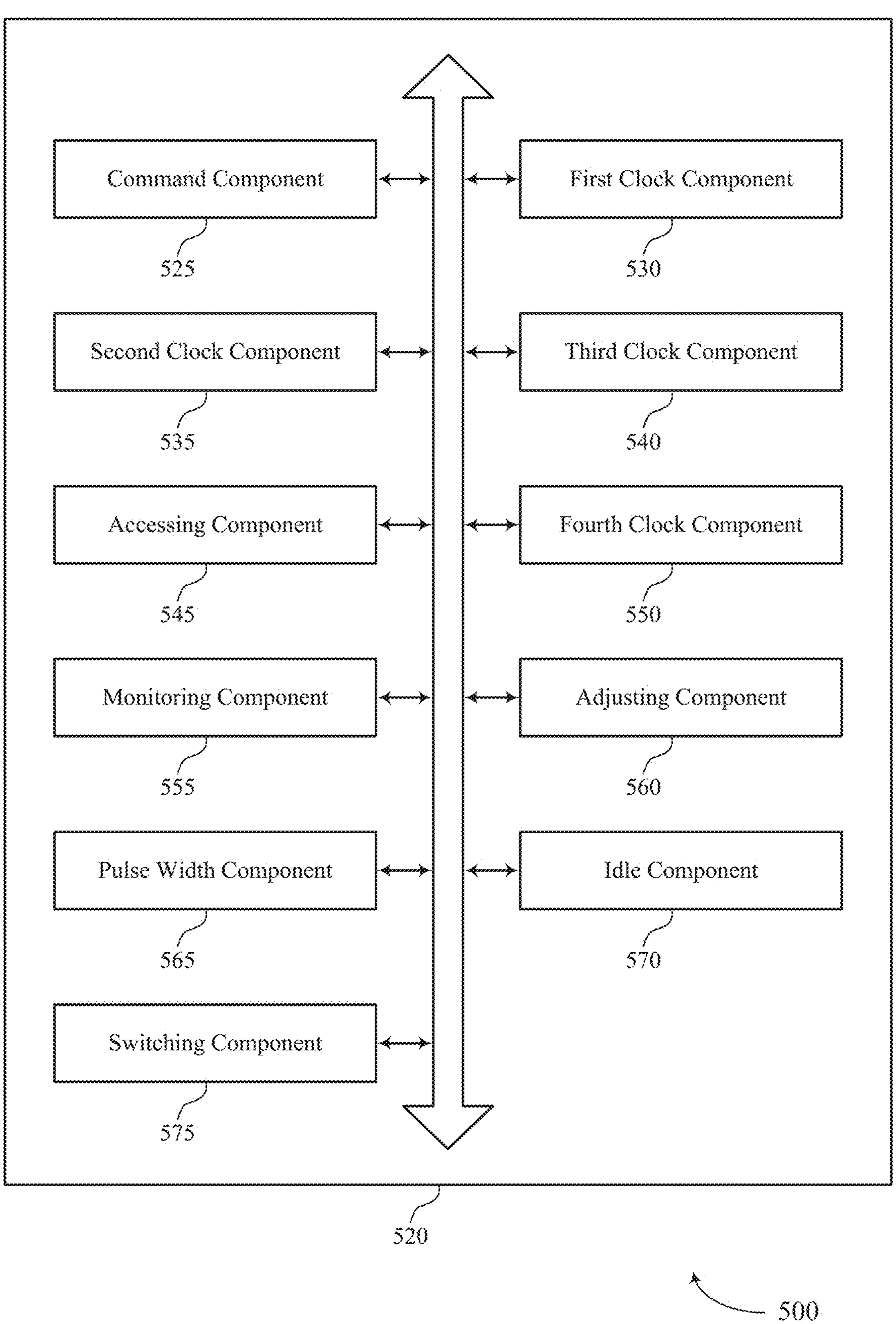
FIG. 5 shows a block diagram of a memory system that supports systems and techniques for clock doubling in accordance with examples as disclosed herein.

FIG. 5 shows a block diagram 500 of a memory system 520 that supports systems and techniques for clock doubling in accordance with examples as disclosed herein. The memory system 520 may be an example of aspects of a memory system as described with reference to FIGS. 1 through 4B. The memory system 520, or various components thereof, may be an example of means for performing various aspects of systems and techniques for clock doubling as described herein. For example, the memory system 520 may include a command component 525, a first clock component 530, a second clock component 535, a third clock component 540, an accessing component 545, a fourth clock component 550, a monitoring component 555, an adjusting component 560, a pulse width component 565, an idle component 570, a switching component 575, or any combination thereof. Each of these components, or components of subcomponents thereof (e.g., one or more processors, one or more memories), may communicate, directly or indirectly, with one another (e.g., via one or more buses).

The command component 525 may be configured as or otherwise support a means for receiving a command to access one or more memory cells of a memory device. The first clock component 530 may be configured as or otherwise support a means for generating a first clock signal having a first frequency based at least in part on the command. The second clock component 535 may be configured as or otherwise support a means for generating a second clock signal having the first frequency based at least in part on the command, where a first phase of the first clock signal is different from a second phase of the second clock signal. The third clock component 540 may be configured as or otherwise support a means for generating a third clock signal based at least in part on the first clock signal and the second clock signal, the third clock signal having a second frequency that is higher than the first frequency. The accessing component 545 may be configured as or otherwise support a means for accessing the one or more memory cells based at least in part on the third clock signal.

In some examples, the fourth clock component 550 may be configured as or otherwise support a means for generating a fourth clock signal based at least in part on the third clock signal, the fourth clock signal having a third frequency that is lower than the second frequency. In some examples, the monitoring component 555 may be configured as or otherwise support a means for monitoring a duty cycle of the fourth clock signal. In some examples, the adjusting component 560 may be configured as or otherwise support a means for adjusting a first delay of the first clock signal or a second delay of the second clock signal based at least in part on the duty cycle satisfying a threshold duty cycle, where a duration between respective pulses of the third clock signal is adjusted based at least in part on adjusting the first delay or the second delay.

In some examples, the monitoring component 555 may be configured as or otherwise support a means for monitoring, after the first delay or the second delay is adjusted, the duty cycle of the fourth clock signal. In some examples, the adjusting component 560 may be configured as or otherwise support a means for adjusting, based at least in part on the duty cycle satisfying the threshold duty cycle after the first delay or the second delay is adjusted, the first delay or the second delay.

In some examples, the duty cycle satisfying the threshold duty cycle includes the duty cycle being greater than a fifty percent duty cycle.

In some examples, the second phase is phase shifted 180 degrees relative to the first phase based at least in part on the adjusting.

In some examples, the monitoring component 555 may be configured as or otherwise support a means for monitoring a duty cycle of the third clock signal. In some examples, the pulse width component 565 may be configured as or otherwise support a means for determining a pulse width of the third clock signal based at least in part on the first frequency and the duty cycle of the third clock signal. In some examples, the adjusting component 560 may be configured as or otherwise support a means for adjusting a first delay of the first clock signal or a second delay of the second clock signal based at least in part on the pulse width satisfying a threshold pulse width, where the pulse width of the third clock signal is adjusted based at least in part on adjusting the first delay or the second delay.

In some examples, the second frequency is twice the first frequency.

In some examples, the first clock signal has a first pulse width, the second clock signal has the first pulse width, and the third clock signal has a second pulse width that is less than the first pulse width.

In some examples, the adjusting component 560 may be configured as or otherwise support a means for adjusting, after generating the third clock signal, the second pulse width.

In some examples, the third clock signal has a third phase different from the first phase and the second phase.

In some examples, the second phase is phase shifted 180 degrees relative to the first phase.

In some examples, the idle component 570 may be configured as or otherwise support a means for determining, after accessing the one or more memory cells, that the memory device is in an idle state. In some examples, the switching component 575 may be configured as or otherwise support a means for switching an output of a multiplexer from the third clock signal to the first clock signal based at least in part on the memory device being in the idle state.

In some examples, the described functionality of the memory system 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 520, or various components thereof, may be implemented at least in part by instructions (e.g., stored in memory, non-transitory computer-readable medium) executable by such at least one processor.

Figure 6:
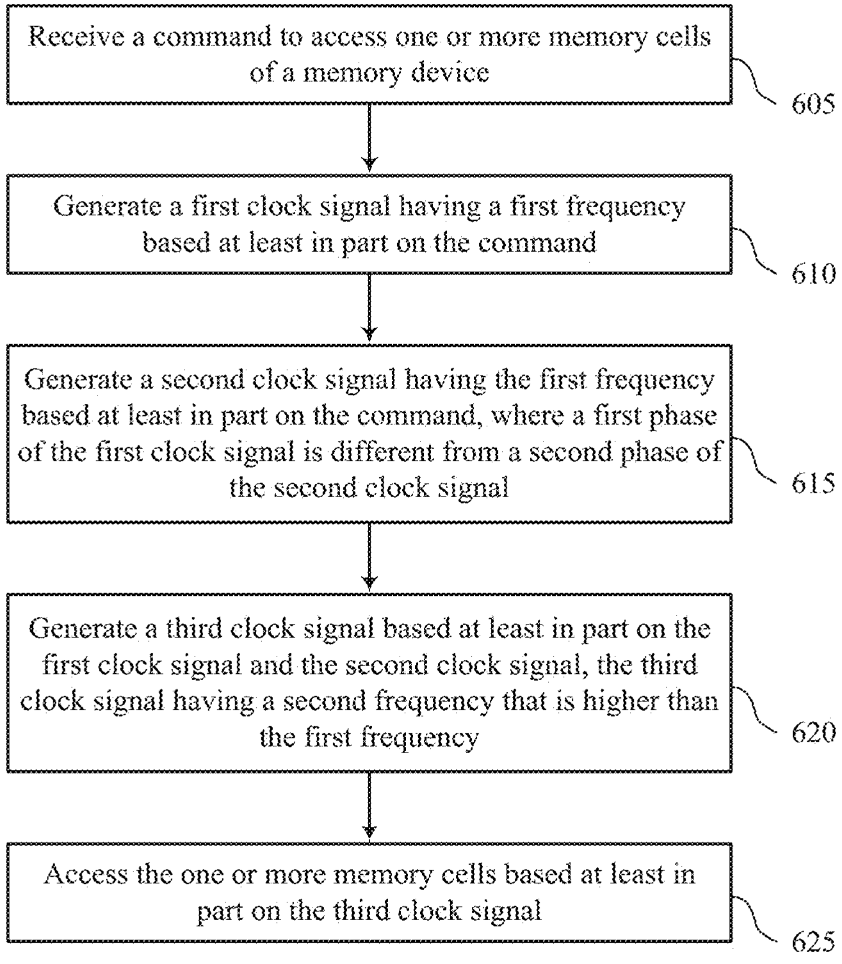
FIG. 6 shows a flowchart illustrating a method or methods that support systems and techniques for clock doubling in accordance with examples as disclosed herein.

FIG. 6 shows a flowchart illustrating a method 600 that supports systems and techniques for clock doubling in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving a command to access one or more memory cells of a memory device. In some examples, aspects of the operations of 605 may be performed by a command component 525 as described with reference to FIG. 5.

At 610, the method may include generating a first clock signal having a first frequency based at least in part on the command. In some examples, aspects of the operations of 610 may be performed by a first clock component 530 as described with reference to FIG. 5.

At 615, the method may include generating a second clock signal having the first frequency based at least in part on the command, where a first phase of the first clock signal is different from a second phase of the second clock signal. In some examples, aspects of the operations of 615 may be performed by a second clock component 535 as described with reference to FIG. 5.

At 620, the method may include generating a third clock signal based at least in part on the first clock signal and the second clock signal, the third clock signal having a second frequency that is higher than the first frequency. In some examples, aspects of the operations of 620 may be performed by a third clock component 540 as described with reference to FIG. 5.

At 625, the method may include accessing the one or more memory cells based at least in part on the third clock signal. In some examples, aspects of the operations of 625 may be performed by an accessing component 545 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command to access one or more memory cells of a memory device; generating a first clock signal having a first frequency based at least in part on the command; generating a second clock signal having the first frequency based at least in part on the command, where a first phase of the first clock signal is different from a second phase of the second clock signal; generating a third clock signal based at least in part on the first clock signal and the second clock signal, the third clock signal having a second frequency that is higher than the first frequency; and accessing the one or more memory cells based at least in part on the third clock signal.

Aspect 2: The method, apparatus, or non-transitory computer-readable medium of aspect 1, further including operations, features, circuitry, logic, means, or instructions, or any combination thereof for generating a fourth clock signal based at least in part on the third clock signal, the fourth clock signal having a third frequency that is lower than the second frequency; monitoring a duty cycle of the fourth clock signal; and adjusting a first delay of the first clock signal or a second delay of the second clock signal based at least in part on the duty cycle satisfying a threshold duty cycle, where a duration between respective pulses of the third clock signal is adjusted based at least in part on adjusting the first delay or the second delay.

Aspect 3: The method, apparatus, or non-transitory computer-readable medium of aspect 2, further including operations, features, circuitry, logic, means, or instructions, or any combination thereof for monitoring, after the first delay or the second delay is adjusted, the duty cycle of the fourth clock signal and adjusting, based at least in part on the duty cycle satisfying the threshold duty cycle after the first delay or the second delay is adjusted, the first delay or the second delay.

Aspect 4: The method, apparatus, or non-transitory computer-readable medium of any of aspects 2 through 3, where the duty cycle satisfying the threshold duty cycle includes the duty cycle being greater than a fifty percent duty cycle.

Aspect 5: The method, apparatus, or non-transitory computer-readable medium of any of aspects 2 through 4, where the second phase is phase shifted 180 degrees relative to the first phase based at least in part on the adjusting.

Aspect 6: The method, apparatus, or non-transitory computer-readable medium of aspect 1, further including operations, features, circuitry, logic, means, or instructions, or any combination thereof for monitoring a duty cycle of the third clock signal; determining a pulse width of the third clock signal based at least in part on the first frequency and the duty cycle of the third clock signal; and adjusting a first delay of the first clock signal or a second delay of the second clock signal based at least in part on the pulse width satisfying a threshold pulse width, where the pulse width of the third clock signal is adjusted based at least in part on adjusting the first delay or the second delay.

Aspect 7: The method, apparatus, or non-transitory computer-readable medium of any of aspects 1 through 6, where the second frequency is twice the first frequency.

Aspect 8: The method, apparatus, or non-transitory computer-readable medium of any of aspects 1 through 7, where the first clock signal has a first pulse width, the second clock signal has the first pulse width, and the third clock signal has a second pulse width that is less than the first pulse width.

Aspect 9: The method, apparatus, or non-transitory computer-readable medium of aspect 8, further including operations, features, circuitry, logic, means, or instructions, or any combination thereof for adjusting, after generating the third clock signal, the second pulse width.

Aspect 10: The method, apparatus, or non-transitory computer-readable medium of any of aspects 1 through 9, where the third clock signal has a third phase different from the first phase and the second phase.

Aspect 11: The method, apparatus, or non-transitory computer-readable medium of any of aspects 1 through 10, where the second phase is phase shifted 180 degrees relative to the first phase.

Aspect 12: The method, apparatus, or non-transitory computer-readable medium of any of aspects 1 through 11, further including operations, features, circuitry, logic, means, or instructions, or any combination thereof for determining, after accessing the one or more memory cells, that the memory device is in an idle state and switching an output of a multiplexer from the third clock signal to the first clock signal based at least in part on the memory device being in the idle state.

It should be noted that the aspects described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 13: An apparatus, including: a first circuit configured to generate a first clock signal having a first frequency and a second clock signal having the first frequency, where a first phase of the first clock signal is different from a second phase of the second clock signal; a second circuit coupled with the first circuit, the second circuit configured to generate a third clock signal based at least in part on the first clock signal and the second clock signal, the third clock signal having a second frequency that is higher than the first frequency; and at least one controller coupled with the second circuit and configured to access a memory array of the apparatus using the third clock signal.

Aspect 14: The apparatus of aspect 13, where the apparatus further includes: a third circuit configured to: generate a fourth clock signal based at least in part on the third clock signal and having a third frequency that is lower than the second frequency; and output a signal indicating a duty cycle of the fourth clock signal.

Aspect 15: The apparatus of aspect 14, where the third circuit is configured to: output the signal to a delay component associated with the first clock signal or the second clock signal, or both, where the delay component is configured to adjust a first delay of the first clock signal or a second delay of the second clock signal based at least in part on the signal indicating that the duty cycle satisfies a threshold duty cycle.

Aspect 16: The apparatus of any of aspects 14 through 15, where the first circuit includes a first delay component configured to delay the first clock signal by a first duration and a second delay component configured to delay the second clock signal by a second duration, the first duration, the second duration, or both, are adjusted based at least in part on the signal indicating that the duty cycle satisfies a threshold duty cycle.

Aspect 17: The apparatus of any of aspects 13 through 16, where the second frequency is twice the first frequency.

Aspect 18: The apparatus of any of aspects 13 through 17, where the second circuit includes a first delay component configured to delay the first clock signal and a second delay component configured to delay the second clock signal, where a pulse width of the third clock signal is based at least in part on a delay of the first clock signal and a delay of the second clock signal.

Aspect 19: The apparatus of aspect 18, where the apparatus further includes: a third circuit coupled with the second circuit and configured to: determine the pulse width of the third clock signal based at least in part on the first frequency and a duty cycle of the third clock signal; and output, to the first delay component, the second delay component or both, a signal to adjust the delay of the first clock signal, the delay of the second clock signal, or both, where the pulse width of the third clock signal is adjusted based at least in part on outputting the signal.

Aspect 20: The apparatus of any of aspects 13 through 19, where the second circuit includes: a multiplexer configured to receive the first clock signal and the third clock signal as inputs and to output the first clock signal or the third clock signal based at least in part on a state of the apparatus.

Aspect 21: The apparatus of aspect 20, where the multiplexer is configured to: output the first clock signal when the apparatus is in an idle state; and output the third clock signal when the apparatus is in a non-idle state.

Aspect 22: The apparatus of any of aspects 13 through 21, where the second circuit further includes: a first logic gate configured to receive the first clock signal and a bypass signal as inputs and output the first clock signal or a first signal to a first delay component of the second circuit based at least in part on the bypass signal, the bypass signal based at least in part on a state of the apparatus; and a second logic gate configured to receive the second clock signal and the bypass signal as inputs and to output the second clock signal or a second signal to a second delay component of the second circuit based at least in part on the bypass signal, where the third clock signal is generated based at least in part on the bypass signal.

Aspect 23: The apparatus of any of aspects 13 through 22, where the first clock signal has a first pulse width, the second clock signal has the first pulse width, and the third clock signal has a second pulse width that is less than the first pulse width.

Aspect 24: The apparatus of aspect 23, where the second circuit is configured to: adjust, after generating the third clock signal, the second pulse width.

Aspect 25: The apparatus of any of aspects 13 through 24, where the third clock signal has a third phase different from the first phase and the second phase.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms “electronic communication,” “conductive contact,” “connected,” and “coupled” may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Due to the nature of software, functions described herein can be implemented using software executed by a processor, hardware, firmware, hardwiring, or combinations of any of these. Features implementing functions may be physically located at various positions, including being distributed such that portions of functions are implemented at different physical locations.

Illustrative blocks and modules described herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium, or combination of multiple media, that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving a command to access one or more memory cells of a memory device;

generating a first clock signal having a first frequency based at least in part on the command;

generating a second clock signal having the first frequency based at least in part on the command, wherein a first phase of the first clock signal is different from a second phase of the second clock signal;

generating a third clock signal based at least in part on the first clock signal and the second clock signal, the third clock signal having a second frequency that is higher than the first frequency; and accessing the one or more memory cells based at least in part on the third clock signal.

2. The method of claim 1, further comprising:

generating a fourth clock signal based at least in part on the third clock signal, the fourth clock signal having a third frequency that is lower than the second frequency;

monitoring a duty cycle of the fourth clock signal; and adjusting a first delay of the first clock signal or a second delay of the second clock signal based at least in part on the duty cycle satisfying a threshold duty cycle, wherein a duration between respective pulses of the third clock signal is adjusted based at least in part on adjusting the first delay or the second delay.

3. The method of claim 2, further comprising:

monitoring, after the first delay or the second delay is adjusted, the duty cycle of the fourth clock signal; and adjusting, based at least in part on the duty cycle satisfying the threshold duty cycle after the first delay or the second delay is adjusted, the first delay or the second delay.

4. The method of claim 2, wherein the duty cycle satisfying the threshold duty cycle comprises the duty cycle being greater than a fifty percent duty cycle.

5. The method of claim 2, wherein the second phase is phase shifted 180 degrees relative to the first phase based at least in part on adjusting the first delay of the first clock signal or the second delay of the second clock signal.

6. The method of claim 1, further comprising:

monitoring a duty cycle of the third clock signal;

determining a pulse width of the third clock signal based at least in part on the first frequency and the duty cycle of the third clock signal; and adjusting a first delay of the first clock signal or a second delay of the second clock signal based at least in part on the pulse width satisfying a threshold pulse width, wherein the pulse width of the third clock signal is adjusted based at least in part on adjusting the first delay or the second delay.

7. The method of claim 1, wherein the second frequency is twice the first frequency.

8. The method of claim 1, wherein the first clock signal has a first pulse width, the second clock signal has the first pulse width, and the third clock signal has a second pulse width that is less than the first pulse width.

9. The method of claim 8, further comprising:

adjusting, after generating the third clock signal, the second pulse width.

10. The method of claim 1, wherein the third clock signal has a third phase different from the first phase and the second phase.

11. The method of claim 1, wherein the second phase is phase shifted 180 degrees relative to the first phase.

12. The method of claim 1, further comprising:

determining, after accessing the one or more memory cells, that the memory device is in an idle state; and switching an output of a multiplexer from the third clock signal to the first clock signal based at least in part on the memory device being in the idle state.

13. An apparatus, comprising:

a first circuit configured to generate a first clock signal having a first frequency and a second clock signal having the first frequency, wherein a first phase of the first clock signal is different from a second phase of the second clock signal;

a second circuit coupled with the first circuit, the second circuit configured to generate a third clock signal based at least in part on the first clock signal and the second clock signal, the third clock signal having a second frequency that is higher than the first frequency; and at least one controller coupled with the second circuit and configured to access a memory array of the apparatus using the third clock signal.

14. The apparatus of claim 13, wherein the apparatus further comprises:

a third circuit configured to:

generate a fourth clock signal based at least in part on the third clock signal and having a third frequency that is lower than the second frequency; and output a signal indicating a duty cycle of the fourth clock signal.

15. The apparatus of claim 14, wherein the third circuit is configured to:

output the signal to a delay component associated with the first clock signal or the second clock signal, or both, wherein the delay component is configured to adjust a first delay of the first clock signal or a second delay of the second clock signal based at least in part on the signal indicating that the duty cycle satisfies a threshold duty cycle.

16. The apparatus of claim 14, wherein the first circuit comprises a first delay component configured to delay the first clock signal by a first duration and a second delay component configured to delay the second clock signal by a second duration, wherein the first duration, the second duration, or both, are adjusted based at least in part on the signal indicating that the duty cycle satisfies a threshold duty cycle.

17. The apparatus of claim 13, wherein the second frequency is twice the first frequency.

18. The apparatus of claim 13, wherein the second circuit comprises a first delay component configured to delay the first clock signal and a second delay component configured to delay the second clock signal, wherein a pulse width of the third clock signal is based at least in part on a delay of the first clock signal and a delay of the second clock signal.

19. The apparatus of claim 18, wherein the apparatus further comprises:

a third circuit coupled with the second circuit and configured to:

determine the pulse width of the third clock signal based at least in part on the first frequency and a duty cycle of the third clock signal; and output, to the first delay component, the second delay component or both, a signal to adjust the delay of the first clock signal, the delay of the second clock signal, or both, wherein the pulse width of the third clock signal is adjusted based at least in part on outputting the signal.

20. An apparatus, comprising:

a memory device; and a controller coupled with the memory device, wherein the controller is configured to cause the apparatus to:

receive a command to access one or more memory cells of the memory device;

generate a first clock signal having a first frequency based at least in part on the command;

generate a second clock signal having the first frequency based at least in part on the command, wherein a first phase of the first clock signal is different from a second phase of the second clock signal;

generate a third clock signal based at least in part on the first clock signal and the second clock signal, the third clock signal having a second frequency that is higher than the first frequency; and access the one or more memory cells based at least in part on the third clock signal.

* * * * *